United States Patent
Guha et al.

(10) Patent No.: US 7,829,637 B2
(45) Date of Patent: Nov. 9, 2010

(54) POLYMERIC THICKENER FOR MOLDING COMPOUNDS

(75) Inventors: Probir K. Guha, Troy, MI (US); Michael J. Siwajek, Rochester Hills, MI (US); Brian A. Beach, Detroit, MI (US)

(73) Assignee: Continental Structural Plastics, Troy, MI (US)

( * ) Notice: Subject to any disclaimer, the term of this patent is extended or adjusted under 35 U.S.C. 154(b) by 0 days.

(21) Appl. No.: 12/560,958

(22) Filed: Sep. 16, 2009

(65) Prior Publication Data

US 2010/0093911 A1    Apr. 15, 2010

Related U.S. Application Data

(63) Continuation-in-part of application No. 11/037,908, filed on Jan. 18, 2005, now abandoned.

(60) Provisional application No. 60/545,008, filed on Feb. 17, 2004.

(51) Int. Cl.
 *C08G 63/00* (2006.01)
(52) U.S. Cl. ............... 525/440.06; 525/440.13; 525/440.01
(58) Field of Classification Search ............ 525/440.06, 525/440.13, 440.01
 See application file for complete search history.

(56) References Cited

U.S. PATENT DOCUMENTS

| | | | |
|---|---|---|---|
| 4,067,845 A * | 1/1978 | Epel et al. ............... 523/527 |
| 4,073,828 A * | 2/1978 | Ferrarini et al. ............ 524/590 |
| 4,232,133 A | 11/1980 | Ferrarin, Jr. et al. |
| 4,260,538 A | 4/1981 | Iseler et al. |
| 4,296,020 A * | 10/1981 | Magrans, Jr. ............... 523/521 |
| 4,535,110 A | 8/1985 | Iseler et al. |
| 4,612,149 A | 9/1986 | Iseler et al. |
| 4,622,354 A | 11/1986 | Iseler et al. |
| 4,855,097 A | 8/1989 | Iseler et al. |
| 4,941,936 A | 7/1990 | Wilkinson et al. |
| 4,941,937 A | 7/1990 | Iseler et al. |
| 5,071,613 A | 12/1991 | Fukami et al. |
| 5,100,935 A | 3/1992 | Iseler et al. |
| 5,130,071 A | 7/1992 | Iseler et al. |
| 5,268,400 A | 12/1993 | Iseler et al. |
| 5,561,192 A | 10/1996 | Lee et al. |
| 5,854,317 A | 12/1998 | Rinz |
| 6,251,308 B1 | 6/2001 | Butler |
| 6,436,315 B2 | 8/2002 | Butler |
| 2003/0024639 A1 | 2/2003 | Paulsen et al. |

* cited by examiner

*Primary Examiner*—Randy Gulakowski
*Assistant Examiner*—Alicia M Toscano
(74) *Attorney, Agent, or Firm*—Gifford, Krass, Sprinkle, Anderson & Citkowski, P.C.

(57) ABSTRACT

A molding composition is provided that includes a thermoset cross-linkable polymeric resin, a fibrous filler and a thickener system. The thickener system includes an amine and an isocyanate that are reactive to form a polyurea. The polyurea is operative to thicken the molding composition formulation prior to polymeric resin thermoset with superior properties relative to conventional thickener systems. A molded article produced from a cross-linked thermoset polymeric resin containing fibrous filler and a polyurea present from 1 to 5 total weight percent of the article either forms an interpenetrating network between the resin and the polyurea or the resin and polyurea crosslink upon resin thermoset to further strengthen the resulting article. An alkali earth oxide or hydroxide simultaneously thickens through interaction with carboxylate functionality of the cross-linkable resin to provide a superior viscosity build and humidity tolerance.

19 Claims, 2 Drawing Sheets

US 7,829,637 B2

POLYMERIC THICKENER FOR MOLDING COMPOUNDS

CROSS-REFERENCE TO RELATED APPLICATIONS

This application is a continuation-in-part of U.S. patent application Ser. No. 11/037,908 filed Jan. 18, 2005, which claims priority of U.S. Provisional Patent Application Ser. No. 60/545,008 filed Feb. 17, 2004, which is incorporated herein by reference.

FIELD OF THE INVENTION

The present invention generally relates to polymeric additives and in particular to polyurea thickening additives.

BACKGROUND OF THE INVENTION

Thickeners are regularly added to sheet molding compounds (SMC) or bulk molding compounds (BMC) in order to facilitate handling and adhesion between low molecular weight polymeric resin and fiber components during mold filling. The low molecular weight polymeric resins are increased in viscosity through polymerization. Typical of these low molecular weight polymeric resins are unsaturated polyester and vinyl ester. In the case of an unsaturated polymeric resin, the addition of di- or poly-functional species are cross-linked to form a branched network of polymer chains.

One type of thickener includes alkali earth oxides and hydroxides. Of these thickeners, magnesium oxide is the most commonly used of such thickeners. Generally, it is believed that alkali earth oxides and hydroxides form ionic bonds with functional moieties of polymeric resins present. The functional moieties illustratively include terminal carboxylate groups of polyester resins.

Diisocyanates represent another type of thickener. Diisocyanates form covalent urethane bonds with hydroxyl groups associated with polymeric resin. The inclusion of a diamine, diol, polyamine or polyol separate from the polyester resin allows thickening to occur through formation of an interpenetrating network relative to the polyester resin. While diisocyanate thickeners tend to increase viscosity rapidly and retain the viscosity over time, the material flow associated with diisocyanate thickened material within a mold is generally less than desirable. Exemplary compositions are detailed in U.S. Pat. Nos. 4,067,845; 4,073,828; 4,232,133; 4,296,020; 4,622,384; 5,100,935; and 5,268,400. Alternatively, alkali earth oxide or hydroxide thickeners tend to add viscosity more slowly and are sensitive to humidity even after ionic bond formation has occurred. Another feature of the ionic bonds formed through alkali earth oxide or hydroxide thickeners is that the bonds tend to weaken at the temperatures associated with molding thereby reducing compound viscosity and increasing material flow.

The prior art attempts have met with limited success in improving molding compound properties such that initial viscosity increases rapidly, is maintained in the presence of humidity, and viscosity reduces under molding conditions. These attempts have included the concept of using both alkali earth oxide or hydroxide thickeners and diisocyanate thickeners in the same system. E. G. Melby and J. M. Castro, Chapter 3, Comprehensive Polymer Science, Pergamon Press (1989). Unfortunately, such systems have met with limited commercial acceptance and have failed to attain practical usability. As isocyanate reaction with an additive of a diamine, diol, polyamine or polyol to form an interpenetrating network relative to the curable polyester resin thickens independent of terminal carboxylate groups of the polyester resin, these different modes of thickening are accepted to build viscosity cumulatively. However, the ability to form molding compounds that have a viscosity build to the formulation of between 20,000 centipoise (initial) and 130,000 centipoise (15 minutes thereafter) and building to between about 30,000,000 to 40,000,000 centipoise at 24 hours and have a viscosity that 10 days later is no more than 60,000,000 centipoise has not been achieved.

Thus, there exists a need for a new molding compound thickener that has reduced moisture sensitivity and a more stable viscosity over a wide temperature range, as compared to conventional alkali earth oxide or alkali earth hydroxide thickeners. There further exists a need to provide viscosity build to the formulation of between 20,000 centipoise (initial) and 130,000 centipoise (15 minutes thereafter) and building to ideally between about 30,000,000 to 40,000,000 centipoise at 24 hours and have a viscosity that 10 days later is no more than 60,000,000 centipoise.

SUMMARY OF THE INVENTION

A molding composition is provided that includes a thermoset cross-linkable polymeric resin, a fibrous filler and a thickener system. The thickener system includes a polyether amine and an isocyanate that are reactive to form a polyurea. A quantity of MgO, $Mg(OH)_2$ or CaO is provided to also thicken through interaction with carboxylate groups of the cross-linkable thermoset resin. The resultant molding composition formulation prior to polymeric resin thermoset cure has superior handling and moisture insensitivity.

A molded article produced from a cross-linked thermoset polymeric resin containing fibrous filler and a polyurea present from 0.05 to 15 total weight percent of the article either forms an interpenetrating network between the resin and the polyurea or the resin and polyurea crosslink upon resin thermoset to further strengthen the resulting article. Preferably the polyurea is present from 1 to 5 total weight percent of the article.

A process for thickening a molding compound includes adding a quantity of an isocyanate having an isocyanate group equivalent number and a quantity of an amine having an amine equivalent group number such that the isocyanate equivalent group number:amine equivalent group number ratio is between 10:1 and 1:10 to a molding composition formulation that contains a thermoset cross-linkable polymeric resin, along with a quantity of MgO, $Mg(OH)_2$ or CaO. A period of time is provided to allow the amine and isocyanate to react to form a polyurea prior to cross-linking of the thermoset cross-linkable resin.

DETAILED DESCRIPTION OF THE PREFERRED EMBODIMENTS

Figure 1:
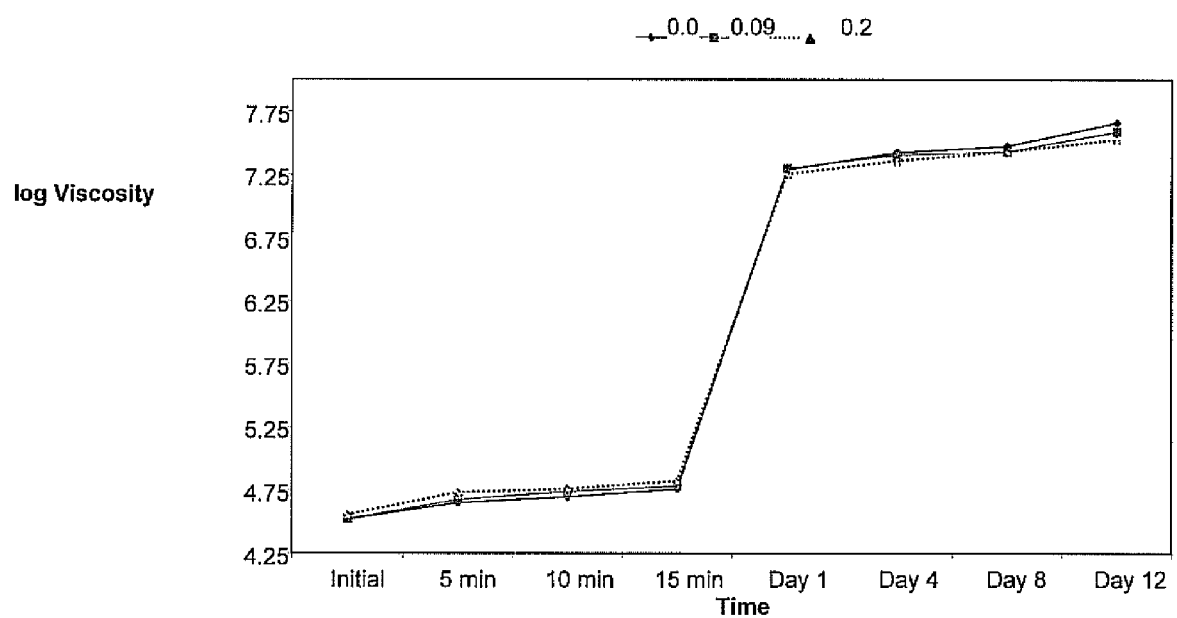
FIG. 1 is a logarithmic plot of viscosity for an inventive system containing 2.37 total weight percent of an inventive isocyanate and 0.07 total weight percent of an inventive amine as a function of time in the presence of water levels of 0, 0.09 and 0.2 parts per hundred resin in the presence of 25 total weight percent magnesium oxide dispersion.

In accordance with the present invention, an isocyanate containing species and an amine containing species are introduced into the uncured polymeric resin of a sheet molding compound or bulk molding compound under conditions suitable for the formation of a polyurea thickener. A molding compound thickened by an inventive polyurea alone, or in combination with a conventional alkali earth oxide or hydroxide, exhibits less sensitivity to moisture and initial setup temperature as compared to conventional alkali earth oxide or hydroxide thickened molding compound systems and also affords a superior viscosity at 15 minutes after formulation than the polyurea thickener alone can achieve. A synergistic result is noted between these two modes of unrelated thickening.

Amines operative in the present invention illustratively include diamines such as $C_2$-$C_{24}$ linear aliphatic diamines, $C_2$-$C_{24}$ branched aliphatic diamines, and aryl diamines and polymer backbones having the amines extending therefrom; and triamines such as aliphatic alkylene oxide triamines. Preferred aliphatic alkylene oxide amines are polyoxyalkylene diamines and triamines, synonymously detailed herein as polyether amines. A polyether backbone affords superior stability relative to a polyester backbone in an amine. Specific amines operative herein include iso-octyl amine; 1,12 dodecadiamine; diethyl toluene diamine; polyoxypropylene diamine (PPD); and polyoxypropylenetriamine (PPT) having a molecular weight of from 200 to 5,000, with 200 to 600 being preferred. Preferably, the present invention incorporates as an amine component a triamine. An amine component operative herein has a molecular weight of between 120 and 5,000 Daltons. Preferably, a triamine of the present invention has a molecular weight of 200 to 600. Most preferably, a triamine of the present invention has a molecular weight of about 400 Daltons. It is appreciated that an amine component that is a mixture of diamine, multiple diamines, and triamines is also operative herein. In a mixed amine component, preferably, the diamine of the present invention has a lower molecular weight of between 200 and 2,500 Daltons and the triamine has a higher relative molecular weight of between 200 and 5,000 Daltons. It is appreciated that a triamine present in combination with a diamine will provide branched polyureas that will form higher viscosity thickening. When a triamine is present it is typically provided in a stoichiometric ratio relative to a diamine of 0.01-25:1. The amine component of the present invention is typically present from 0.01 to 10 total weight percent of the molding composition formulation measured absent inert fillers.

An isocyanate operative in the present invention illustratively includes hexamethylene-1-isocyanate, 2,2,4-trimethylhexamethylene-1-isocyanate; alicyclic isocyanates such as cyclohexane isocyanate, dicyclohexylmethane-4-isocyanate, aryl isocyanates such as toluene-2-isocyanate, naphthylene-1-isocyanate; polyisocyanates such as aliphatic polyisocyanates such as hexamethylene-1,6-diisocyanate, 2,2,4-trimethylhexamethylene-1,6-diisocyanate; alicyclic polyisocyanates such as cyclohexane-1,4-diisocyanate, dicyclohexylmethane-4,4'-diisocyanate, aryl polyisocyanates such as p-phenylene diisocyanate, toluene-2,4-isocyanate, and diphenyl methane 2,4'-diisocyanate. Additionally, an isocyanate operative herein includes polyphenylene polymethylene polyisocyanate derived from condensation of aniline and formalin, liquidified diphenylmethane diisocyanates containing carbodiimide groups or uretonimine groups, modified polyisocyanates containing at least one urethane group, allophanate group, biuret group or uretodione group. Particularly preferred isocyanates are modified polyisocyanates containing urethane groups, allophanate groups or uretodione groups such that the polyisocyanates are liquid at the ambient temperature such as 20° C.

A liquid polyisocyanate operative in the present invention is formed by reaction of an isocyanate as detailed herein with a polyether polyol, polyester polyol, or a diamine. The liquid polyisocyanate formed by reaction of an isocyanate with a diamine to yields an isocyanate terminated polyurea. The diamine having terminal amine groups and a molecular weight from 400 to 5,000. The polyol having terminal hydroxyl groups and a molecular weight from 400 to 5,000 Daltons. Preferably, the polyol is a condensation product of a $C_2$-$C_6$ alkylene oxide with a $C_2$-$C_8$ alkylene glycol. Specific $C_2$-$C_6$ alkylene oxides illustratively include ethylene oxide, and propylene oxide. Specific $C_2$-$C_8$ alkylene glycols illustratively include ethylene glycol, diethylene glycol, isopropylene glycol, propylene glycol, tetramethylene glycol, and hexamethylene glycol, and their condensation products. More preferably the polyol is a hydroxyl functionality of between 2.0 and 2.8. Most preferably the hydroxyl functionality is between 2.0 and 2.4 and the molecular weight is between 1,400 and 5,000 Daltons.

A liquid polyisocyanate containing urethane or urea linkages is formed under moisture-free conditions to inhibit reaction between isocyanate and water. A dry nitrogen, argon, or air blanket is suitable to inhibit the isocyanate and water reaction. Mixing the isocyanate with a suitable reaction catalyst and optionally a polymeric resin cross-linking monomer followed by heating and introduction of the polyol and or diamine is sufficient to form the polyisocyanate. Conventional reaction catalysts include organometallic compounds, tertiary amines, and other nitrogen bearing compounds. Catalysts are typically present from 0 to 3 weight percent of the total reaction mixture weight. Typical reaction temperatures range from 10 to 120° C. The cross-linking monomer component, when present, typically represents 0 to 80 weight percent of mixture. It is appreciated that a polymerization inhibitor is optionally included to preclude premature styrene polymerization or reaction with the reactants. Polymerization inhibitors include hydroquinones and t-butyl catechol. The NCO content of resulting polyisocyanate is determined according to ASTM D2572-97.

Ethylenically unsaturated monomers operative herein illustratively include styrene, vinyl toluene, divinyl benzene, acrylic acid esters and methacrylic acid esters, such as methylacrylate, ethylacrylate, n-butylacrylate, 2-ethylhexylacrylate, methylmethacrylate, pentaerythritol thiacrylate, ethyleneglycol dimethacrylate, diallyl maleate, diallyl fumarate, triallylcyanurate, vinyl acetate, vinyl propionate, vinyl ether, acrylonitrile, and the like. The ethylenically unsaturated monomer is a comparatively low viscosity compound compared to the polymeric thickener components and has at least one ethylenically unsaturated group which will react with itself or with ethylenic unsaturation within the SMC or BMC prepolymer resin by free radical activation. Preferably, if the base molding composition polymeric resin is dissolved in a monomer, then the monomer in which the isocyanate is dissolved is identical to that in which the base molding composition polymeric resin is dissolved.

An example of a particularly preferred polyisocyanate is a linear polyurethane having a 2.0-2.8 polyol and 2.0-2.8 isocyanate equivalency dissolved in styrene monomer, where the molecular weight ranges from 400 to 50,000 Daltons.

The equivalent ratio of isocyanate groups (NCO):amine groups ($NH_2$) in the present invention ranges from 10:1 to 1:10. Preferably, the isocyanate:amine group ratio is between 3:1 and 1:6. The ability to provide a highly desirous viscosity build to the formulation of between 20,000 centipoise (initial) and 130,000 centipoise (15 minutes thereafter) and building to between about 30,000,000 to 40,000,000 centipoise at 24 hours and have a viscosity that 10 days later is no more than 60,000,000 centipoise is noted for a ratio of 6:1 to 5:1. Most preferably, the isocyanate group:amine group ratio is 1:1 to 1:1.25. In the case of conventional polyurea formation, the equivalent isocyanate group:amine group ratio is ordinarily set at around 1.0, but in the case of the present invention, curing proceeds sufficiently at 1.0 or higher to give a product having desirable handling and physical properties. While the specific reason for this result is unknown, a non-limiting hypothesis is that competitive interactions between conventional molding compound components tends to preferentially remove amine reactant from polyurea formation relative to isocyanate.

It is appreciated that an inventive polyurea thickener system increases in viscosity to facilitate handling during mold fill. Depending upon the residual isocyanate functionality after reaction with an amine, an inventive thickener system in the instance of few residual isocyanate groups forms an interpenetrating polymer network with the polymeric resin upon cure, or alternatively with comparatively greater residual isocyanate groups, an inventive polyurea thickener cross-links to the polymeric resin in concert with ethylenically unsaturated monomer present as a solvent for the polymer resin thereby resulting in cross-linkages between the inventive polyurea thickener and the polymeric resin of the SMC or BMC molding compound.

While the weight percentage of inventive polyurea thickener in an SMC or BMC formulation to provide formulation thickening prior to thermoset is dependent on factors including molecular weights of amine and isocyanate reactants, net amine functionality, net isocyanate functionality, formulation handling temperature, nature of filler and quantity of filler, an inventive polyurea thickener is typically present from 0.05 to 15 total weight percent of the SMC or BMC formulation. Based on the preferred amine and polyisocyanates detailed herein, inventive polyurea thickener represents 1 to 3.7 total weight percent of an SMC or BMC formulation (Table I).

An SMC or BMC formulation incorporating an inventive thickener has several attractive attributes. The nature of the base SMC or BMC formulation derives benefits from incorporation of inventive thickener is not critical. Base formulations suitable for incorporation of a base thickener are described in U.S. Pat. Nos. 4,260,538; 4,643,126; 5,100,935; 5,268,400; 5,854,317 and 6,780,923.

A principal component of an SMC or BMC formulation is a cross-linkable polymer resin such as an unsaturated polyester resin or vinyl ester resin. The prepolymer polymeric resin has a molecular weight on average of typically between 400 and 100,000 Daltons. The polyester prepolymer resins typically represent condensation products derived from the condensation of unsaturated dibasic acids and/or anhydrides with polyols. It is appreciated that the saturated di- or polyacids are also part of the condensation process to form polyester prepolymers with a lesser equivalency of reactive ethylenic unsaturation sites.

Vinyl ester resins are also typically employed in SMC or BMC formulations as a polymeric resin. Vinyl ester prepolymer resins are typically the reaction product of an epoxy resin with a carboxylic acid having a single ethylenic unsaturation. Specific vinyl ester resins commonly used are the reaction product of epoxy functionalized bisphenol A with an acrylic acid. As a result of the difference in prepolymer synthesis, the vinyl ester resin prepolymers are typically associated with terminal ethylenic unsaturations while polyester resin prepolymers predominantly have ethylenic unsaturations internal to the prepolymer backbone.

The polymeric resin prepolymer is suspended, and preferably dissolved, in an ethylenically unsaturated monomer that copolymerizes with the resin during the thermoset process. Representative monomers are those optionally mixed with the isocyanate component of the inventive thickener. Preferably, the base molding composition monomer and the optional monomer component in which the isocyanate component of an inventive thickener is mixed are identical. It is appreciated that more than one type of monomer can be used in a molding composition. The monomer provides benefits including lower prepolymer viscosity and thermosetting without formation of a volatile byproduct. Monomer is typically present up to 18.5 total weight percent of a molded article.

An inventive formulation preferably includes a quantity of an alkali earth oxide or hydroxide additive. Alkali earth oxide or hydroxide are known to thicken a polymeric resin prepolymer through chelation reaction between the alkali earth oxide or hydroxide and functional groups of the prepolymer and in particular terminal carboxylate functionality of an ethylenically unsaturated polyester prepolymer resin. However, ambient moisture is competitive with carboxylate functionality for reaction with the alkali earth oxide or hydroxide, as seen in the formulations of U.S. Pat. No. 4,067,845, thereby making those formulations vulnerable at higher loadings to seasonal humidity variations and at lower loadings incapable of achieving desired terminal and stable viscosities less than 60 million centipoise. Without intending to be bound to a particular theory, it is believed that the polyurea thickener with a stoichiometry of isocyanate group:amine group other than 1:1 retains a functionality that is competitive for ambient moisture with the carboxylate-alkali earth oxide or hydroxide interaction. An inventive formulation contains between 0.2 and 2 total weight percent of MgO, or a molar stoichiometric equivalent of $Mg(OH)_2$, CaO, or a combination thereof of the two alone, or with MgO. Preferably the earth oxide or hydroxide of MgO or its equivalent is present from 0.1 to 1.2 total weight percent. More preferably, the alkali earth oxide or hydroxide is present from 0.1 to 0.9 total weight percent based on MgO. Most preferably, the alkali earth oxide or hydroxide is present from 0.1 to 0.5 total weight percent based on MgO. As with the amine and isocyanate components, the amount of the alkali earth oxide or hydroxide of the inventive molding composition formulation is measured absent inert fillers.

A typical molding composition includes a free radical initiator to initiate cross-linking between the polymeric prepolymer resin with itself or with ethylenically unsaturated monomer, if present. A free radical initiator is typically chosen to preclude significant cross-linking at lower temperature so as to control the thermoset conditions. Conventional free radical polymerization initiators contain either a peroxide or azo group. Peroxides operative herein illustratively include benzoyl peroxide, cyclohexanone peroxide, ditertiary butyl peroxide, dicumyl peroxide, tertiary butyl perbenzoate and 1,1-bis(t-butyl peroxy) 3,3,5-trimethylcyclohexane. Azo species operative herein illustratively include azobisisobutyronitrile and t-butylazoisobutyronitrile. While the quantity of free radical polymerization initiator present varies with factors such as desired thermoset temperature and decomposition thermodynamics, an initiator is typically present from 0.1 to 3 total weight percent. In order to lessen cross-linking at temperatures below the desired thermoset temperature, a polymerization inhibitor is often included in base molding formulations. Hydroquinone and t-butyl catechol are conventional inhibitors. An inhibitor is typically present between 0 and 1 total weight percent.

The molding composition preferably includes a particulate filler. Particulate fillers operative in such molding compositions illustratively include calcium carbonate, calcium silicate, alumina, silica, talcs, dolomite, vermiculite, diatomaceous earth, glass spheres, graphite, metal and combinations thereof. Factors relevant in the choice of a particulate filler illustratively include filler cost, resultant viscosity of flow properties, resultant shrinkage, surface finish weight, flammability, electrical conductivity, and chemical resistance of the thermoset formulation. Particulate filler typically accounts from 0 to 80 weight percent. Typical filler sizes are from 0.1 to 50 microns.

A fiber filler is typically added to provide strength relative to a particulate filler. Fiber fillers operative herein illustratively include glass, carbon, polyimides, polyesters, polyamides, and natural fibers such as cotton, silk, and hemp. Preferably, the fiber filler is glass fiber in the form of chopped glass strands. More preferably, chopped glass strands are provided in lengths ranging from 5 to 50 millimeters. Fiber fillers are typically present from 0 to 80 total weight percent.

A mold release agent is typically provided to promote mold release. Mold releases include fatty acid salts illustratively including oleates, palmitates, stearates of metal ions such as sodium, zinc, calcium, magnesium, and lithium. A mold release is typically present from 0 to 5 total weight percent.

A low profile additive is optionally provided to improve surface properties and dimensional stability of a resulting molded product. Low profile additives illustratively include thermoplastics and elastomers such as polyethylene, polystyrene, polyvinyl toluene, polyacrylates, polyethylene ether polymers, polyphenylene oxide polymers, and combinations thereof. Copolymers operative as low profile additives include the above-recited polymers in addition to copolymers of the same including butadiene, acrylonitrile, and vinyl chloride. Low profile additives are typically present from 0 to 50 total weight percent and more often from 5 to 40 total weight percent.

It is appreciated that the present invention optionally also incorporates additional additives illustratively including flame retardants, plasticizers, colorants, and other processing additives conventional to the art.

In addition to forming an article directly from a molding composition, it is appreciated that an inventive molding compound is readily penetrated onto various porous substrates illustratively including metal wire mesh.

Molding compositions of the present invention are well suited for the rapid production of molded composite material with less seasonal variation associated with humidity and molding temperature for the production of a variety of products illustratively including bumper beams, automotive door panel components, automotive floor components, and various industrial and consumer product housings. Fibrous glass reinforcing materials operative in the present invention illustratively include chopped strand, matte, continuous strand, surfacing matte, glass cloth and roving cloth. It is also appreciated that other non-silaceous reinforcing fibrous materials are also operative herein illustratively including natural fibers, aramid fibers, carbon fiber, each alone, or in combination with glass fibers.

The present invention is further illustrated with respect to the following non-limiting examples.

Example 1

Polyoxypropylenetriamine (PPT) having an average molecular weight of 400 is mixed into a conventional sheet molding compound prototype formulation containing unsaturated polyester resin, thermoplastic additives, organic peroxides, inhibitor, filler, mold release, and pigment sold by Continental Structural Plastics under the trade name TCA®. This base formulation serves as a control, This amine mixture is added to 0.07 total weight percent of the molding compound formulation. A polyurethane having a isocyanate function of 2.7 and molecular weight of 28,000 is present as 75% by weight in a styrene monomer solution and used as an isocyanate source. The polyurethane solution is added to the molding compound formulation to an amount of 2.3 total weight percent of the molding compound formulation. Water is added to the resultant formulation at levels of 0, 0.09 and 0.2 parts per hundred of molding compound polymeric resin in order to simulate a range of ambient humidity conditions. Viscosity measurements are conducted using a Brookfield LVT viscometer equipped with a number 5 spindle at 20 rpm. The viscosity at these water levels as a function of time is shown in FIG. 1. A greater insensitivity to humidity is indicated for the inventive formulation relative to the base molding compound formulation absent the present invention.

Example 2

Figure 2:
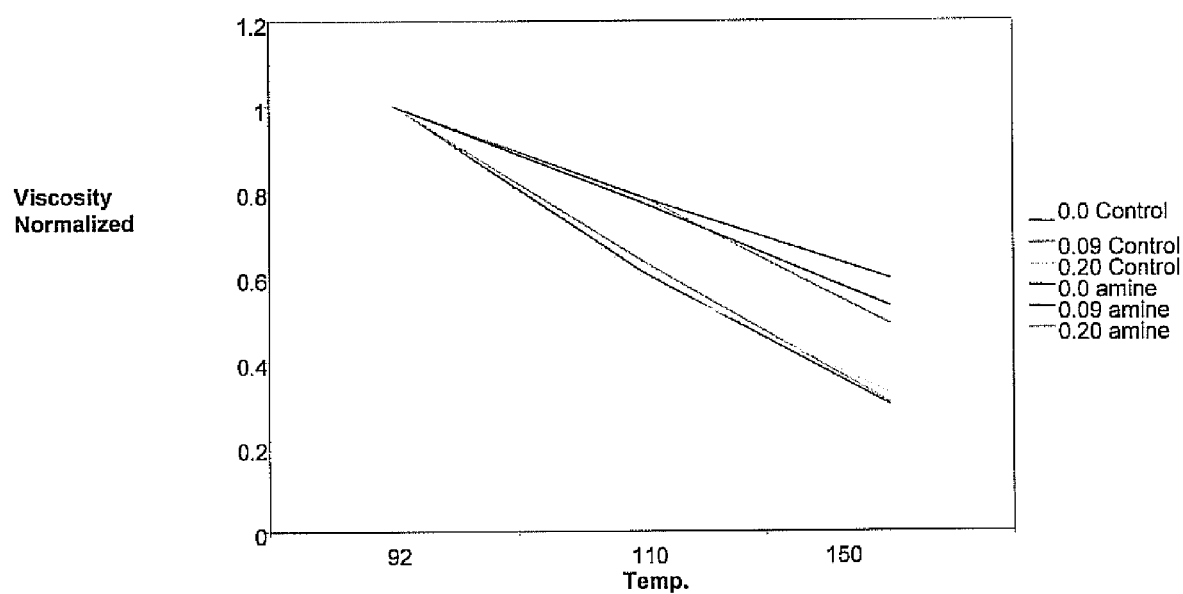
FIG. 2 is a plot of normalized viscosity as a function of temperature for an inventive polyurea thickener as shown in FIG. 1, as compared to a conventional magnesium oxide thickener control.

The base molding compound formulation detailed in Example 1 and that containing the inventive amine and isocyanate components also of Example 1 each had added thereto water to 0, 0.9 and 0.2 parts per hundred of polymeric resin. The resulting mixtures are subjected to a temperature sensitivity study in which viscosity is measured for each sample at three different temperatures of 92°, 100° and 150° F. and then normalized. The results of this study are shown in FIG. 2 and indicate that the inventive formulation has reduced temperature sensitivity as compared to the control.

Example 3

Experimental batches were based on a conventional sheet molding compound formulation containing unsaturated polyester resin, thermoplastic additives, organic peroxides, cure inhibitor, filler, mold release and pigment and correspond to the control formulation detailed in Example 1.

Inventive Hybrid Magnesium Compound Polyamine/Polyisocyanate Thickener

To produce the hybrid inventive formulation containing both alkali earth oxide or hydroxide thickener and polyamine/polyisocyanate thickener, this base formulation is modified to include either: (A) 0.125 total weight percent of magnesium oxide, 0.0375 total weight percent of polyoxypropylene triamine having an average molecular weight of 400, and 1.75 total weight percent of a polyurethane having an isocyanate function of 2.7 and a molecular weight of 28,000 (NCO:$NH_2$=1:1.7); (B) 0.24 total weight percent magnesium oxide, 0.06 total weight percent of polyoxypropylene triamine having an average molecular weight of 400, and 3 total weight percent of a polyurethane having an isocyanate function of 2.7 and a molecular weight of 28,000 (NCO:$NH_2$=1:1.6); (C) 0.5 total weight percent of magnesium oxide, 0.075 total weight percent of polyoxypropylene triamine having an average molecular weight of 400, and 3.50 total weight percent of a polyurethane having an isocyanate function of 2.7 and a molecular weight of 28,000 (NCO:$NH_2$=1:1.7); (D) 0.24 total weight percent magnesium oxide, 0.20 total weight percent of polyoxypropylene triamine having an average molecular weight of 400, and 3.5 total weight percent of a polyurethane having an isocyanate function of 2.7 and a molecular weight of 28,000 (NCO:$NH_2$=1:4.4); (E) 0.24 total weight percent magnesium oxide, 0.01 total weight percent of polyoxypropylene triamine having an average molecular weight of 400, and 3.5 total weight percent of a polyurethane having an isocyanate function of 2.7 and a molecular weight of 28,000 (NCO:$NH_2$=4.5:1); (F) 0.9 total weight percent magnesium hydroxide, 0.20 total weight percent of polyoxypropylene triamine having an average molecular weight of 400, and 3.5 total weight percent of a polyurethane having an isocyanate function of 2.7 and a molecular weight of 28,000 (NCO:$NH_2$=1:2.9); (G) 0.24 total weight percent calcium oxide, 0.0375 total weight percent of polyoxypropylene triamine having an average molecular weight of 400, and 1.75 total weight percent of a polyurethane having an isocyanate function of 2.7 and a molecular weight of 28,000 (NCO:$NH_2$=1:1.7); and (H) 1.2 total weight percent magnesium oxide, 0.20 total weight percent of polyoxypropylene triamine having an average molecular weight of 400, and 3.5 total weight percent of a polyurethane having an isocyanate function of 2.7 and a molecular weight of 28,000 (NCO:$NH_2$=1:4.4). Inventive Example F has a viscosity build profile that is considered less than desirable for typical SMC applications with properties that are largely attributable to the high MgO loading of MgO alone at 1.2 total weight percent. In Table 1, T denotes a triamine, D denotes diamine, MO denotes MgO, MH denotes $Mg(OH)_2$, and CO denotes CaO.

Comparative Magnesium Compound Thickener Alone

The base formulation was modified to include either: (A) 0.125 total weight percent of magnesium oxide alone; (B) 0.24 total weight percent of magnesium oxide; (C) 0.5 total weight percent of magnesium oxide; (D) 0.4 total weight percent of magnesium hydroxide; (E) MgO alone 1.2 total weight percent of magnesium oxide; and (F) 0.9 total weight percent of magnesium hydroxide.

Comparative Polyamine/Polyisocyanate Thickener

Comparative IPN formulations track the amount of IPN present in inventive formulations A-F above. To the base formulation was added: IPN alone (A) 0.0375 total weight percent of polyoxypropylene triamine having an average molecular weight of 400, and 1.75 total weight percent of a polyurethane having an isocyanate function of 2.7 and a molecular weight of 28,000 (NCO:$NH_2$=1:1.7); (B) 0.06 total weight percent of polyoxypropylene triamine having an average molecular weight of 400, and 3 total weight percent of a polyurethane having an isocyanate function of 2.7 and a molecular weight of 28,000 (NCO:$NH_2$=1:1.6); (C) 0.075 total weight percent of polyoxypropylene triamine having an average molecular weight of 400, and 150 total weight percent of a polyurethane having an isocyanate function of 2.7 and a molecular weight of 28,000 (NCO:$NH_2$=1:1.7); (D) 0.20 total weight percent of polyoxypropylene triamine having an average molecular weight of 400, and 3.50 total weight percent of a polyurethane having an isocyanate function of 2.7 and a molecular weight of 28,000 (NCO:$NH_2$=1:4.4); (E) 0.01 total weight percent of polyoxypropylene triamine having an average molecular weight of 400, and 3.50 total weight percent of a polyurethane having an isocyanate function of 2.7 and a molecular weight of 28,000 (NCO:$NH_2$=4.5:1); and (F) 0.20 total weight percent of polyoxypropylene triamine having an average molecular weight of 400, and 3.5 total weight percent of a polyurethane having an isocyanate function of 2.7 and a molecular weight of 28,000 (NCO:$NH_2$=1:2.9).

Each of the samples of sheet molding composition, namely inventive: (A)-(G), magnesium compound alone: (A)-(D), (F) and (G); and IPN alone: (A)-(F), is subjected to viscosity measurement using a Brookfield LVT viscometer equipped with a number 5 spindle operating at 20 rpm as detailed in Example 1. No water or other materials is added to simulate humidity. Viscosity is measured initially upon formulation, after 15 minutes and at 24 hours. The results of these studies are provided in Table I below.

TABLE I

Viscosity of Differently Thickened SMC Formulations (in Centipoise).
Unprocessable values are denoted with a frame.

| Total wt % Mg + IPN | Composition | Initial | Time +15 min. | +24 hours |
|---|---|---|---|---|
| 0.12 MO + 1.79 T | Inventive (A) | 33,100 | 44,800 | 26,600,000 |
| 0.24 MO + 3.06 T | Inventive (B) | 55,200 | 130,000 | 55,000,000 |
| 0.5 MO + 3.58 T | Inventive (C) | 41,200 | 52,000 | 68,000,000 |
| 0.24 MO + 3.7 T | Inventive (D) | 50,200 | 142,000 | 62,000,000 |
| 0.24 MO + 3.51 T | Inventive (E) | 52,800 | 136,000 | 58,000,000 |
| 0.9 MH + 3.7 D | Inventive (F) | 47,200 | 116,000 | 37,000,000 |
| 0.24 CO + 1.79 T | Inventive (G) | 51,600 | 126,000 | 32,000,000 |
| 1.2 + 3.7 | Inventive (H) | 115,000 | 278,000 | 80,000,000 |
| 0.12 MO + 0 | MgO alone (A) | 29,500 | 37,000 | 380,000 |
| 0.24 MO + 0 | MgO alone (B) | 33,600 | 52,800 | 19,000,000 |
| 0.5 MO + 0 | MgO alone (C) | 39,300 | 44,800 | 62,500,000 |
| 0.4 MO + 0 | $Mg(OH)_2$ alone (D) | 31,000 | 42,080 | 9,000,000 |
| 0.9 MH + 0 | $Mg(OH)_2$ alone (F) | 34,000 | 53,600 | 12,600,000 |
| 1.2 MO + 0 | MgO alone (E) | 102,000 | 236,000 | 80,000,000 |

TABLE I-continued

Viscosity of Differently Thickened SMC Formulations (in Centipoise).
Unprocessable values are denoted with a frame.

| Total wt % Mg + IPN | Composition | Initial | Time +15 min. | +24 hours |
|---|---|---|---|---|
| 0 + 1.79 T | IPN alone (A) | 32,000 | 227,000 | 27,000,000 |
| 0 + 3.06 T | IPN alone (B) | 38,000 | 325,000 | 36,000,000 |
| 0 + 3.58 T | IPN alone (C) | 41,600 | 490,000 | 42,000,000 |
| 0 + 3.7 T | IPN alone (D) | 43,800 | 496,000 | 46,000,000 |
| 0 + 3.51 T | IPN alone (E) | 38,700 | 456,000 | 39,600,000 |
| 0 + 3.7 D | IPN (F) | 38,700 | 48,800 | 13,800,000 |

As noted in Table I, none of the comparative magnesium compound alone, or polyamine/polyisocyanate formulations alone, or formulations only 0.5 total weight percent MgO alone has a desirable viscosity build profile or 24 hour viscosity value. However, alkaline earth oxide or hydroxide alone thickened formulations demonstrate a higher degree of humidity sensitivity per FIG. 1 that was a prior art problem the present invention addresses. As a result, the present invention shows less seasonal variation than the prior art as well as providing more control over viscosity build profiles than the comparative examples of the prior art. This is true regardless of the percentages present. The polyamine/polyisocyanate (IPN) only thickened system also proves to not be ideal due to viscosity build at 15 minutes regardless of whether total IPN components are present at 1.79 or 3.58 total weight percent is simply unprocessable; however, these loadings of polyamine/polyisocyanate thickener are needed to attain an acceptable viscosity at 24 hours. Values in Table I are framed that are outside preferred viscosity processing values. CaO present at 0.24 total weight percent represents 0.71% of MgO in mole percent and as shown in Table I provides viscosity build values intermediate between 0.12 and 0.24 total weight percent MgO.

The resulting inventive formulations have surprisingly attractive viscosity build profiles and are less responsive to ambient humidity relative to alkali earth oxide or hydroxide alone thickness.

Example 4

Experimental inventive compositions of Example 3 are reproduced with the substitution of CaO in stoichiometric equivalents for MgO or Mg(OH)$_2$, with comparable viscosity build profiles and humidity tolerances expected.

References recited herein are indicative of the level of skill in the art to which the invention pertains. These references are hereby incorporated by reference to the same extent as if each individual reference was explicitly and individually incorporated herein by reference.

The invention claimed is:

1. A molding composition formulation comprising:
a thermoset cross-linkable polyester polymeric resin;
a thickener system comprising a polyether amine and an isocyanate present in an equivalent group number ratio of isocyanate groups:amine groups of between 4.5:1 and 1:4.4 that are reactive to form a polyether polyurea forming an interpenetrating network with said cross-linkable polyester polymeric resin and present from 1 to 3.7 total weight percent of the formulation; and
an additive present from 0.1 to 0.9 total weight and selected from the group consisting of: magnesium oxide, magnesium hydroxide, and calcium oxide.

2. The formulation of claim 1 wherein said additive is present from 0.1 to 0.5 total weight percent.

3. The formulation of claim 1 wherein said amine is a triamine.

4. The formulation of claim 1 wherein said amine has a molecular weight of between 120 and 5,000 Daltons and has a polyether backbone.

5. The formulation of claim 3 wherein said triamine has a polyether backbone.

6. The formulation of claim 1 wherein said additive is magnesium oxide or magnesium hydroxide.

7. The formulation of claim 1 wherein said additive is calcium oxide.

8. The formulation of claim 1 wherein said isocyanate is a diisocyanate.

9. The formulation of claim 1 wherein said isocyanate is a polyisocyanate.

10. The formulation of claim 9 wherein said polyisocyanate is an isocyanate-terminated polyurethane.

11. The formulation of claim 9 wherein said polyisocyanate has a molecular weight of between 400 and 50,000 and a component selected from the group consisting of: a polyether polyol, a polyester polyol, and a diamine.

12. A process for thickening a molding composition formulation comprising:
adding a quantity of an isocyanate having an isocyanate group equivalent number and a quantity of a polyether amine having an amine equivalent group number such that the isocyanate equivalent group number:amine equivalent group number ratio is between 4.5:1 and 1:4.4 to a molding composition formulation containing a thermoset polyester cross-linkable polymeric resin, the quantity of said amine and the quantity of said polyisocyanate being between 1 and 3.7 total weight percent;
introducing an additive in an amount of between 0.1 and 0.9 total weight percent and selected from the group consisting of magnesium oxide, magnesium hydroxide and calcium oxide; and
allowing sufficient time for said amine and said isocyanate to react to form a polyether polyurea interpenetrating network prior to cross-linking of said thermoset polyester cross-linkable resin.

13. The process of claim 12 wherein said amine is selected from the group consisting of: a diamine, a triamine or a combination thereof.

14. The process of claim 12 wherein said isocyanate is a diisocyanate.

15. The process of claim 12 wherein said isocyanate is a polyisocyanate.

16. The process of claim 12 wherein the molding composition formulation has an initial viscosity build of 20,000 centipoise, a viscosity build of 130,000 centipoise 15 minutes thereafter, a viscosity build between about 30,000,000 to 40,000,000 centipoise at 24 hours and has a viscosity that 10 days later is no more than 60,000,000 centipoise.

17. The process of claim 12 further comprising cross-linking said polyurea to said cross-linkable polymeric resin.

18. A molded article produced from a molding composition formulation comprising:

an additive in an amount of between 0.1 and 0.9 total weight percent and selected from the group consisting of magnesium oxide, magnesium hydroxide and calcium oxide;

a cross-linked thermoset polyester polymeric resin;

a fibrous filler coated by said resin;

a polyether polyurea formed from an isocyanate and an amine with an equivalent group number ratio of isocyanate group:amine group of between 4.5:1 and 1:4.4 and said polyether polyurea being present from 1 to 3.7 total weight percent of the article and forming an interpenetrating network with the thermoset polyester polymeric resin.

19. The article of claim 18 wherein said resin is cross-linked to said polyurea.

* * * * *